Figure 6:
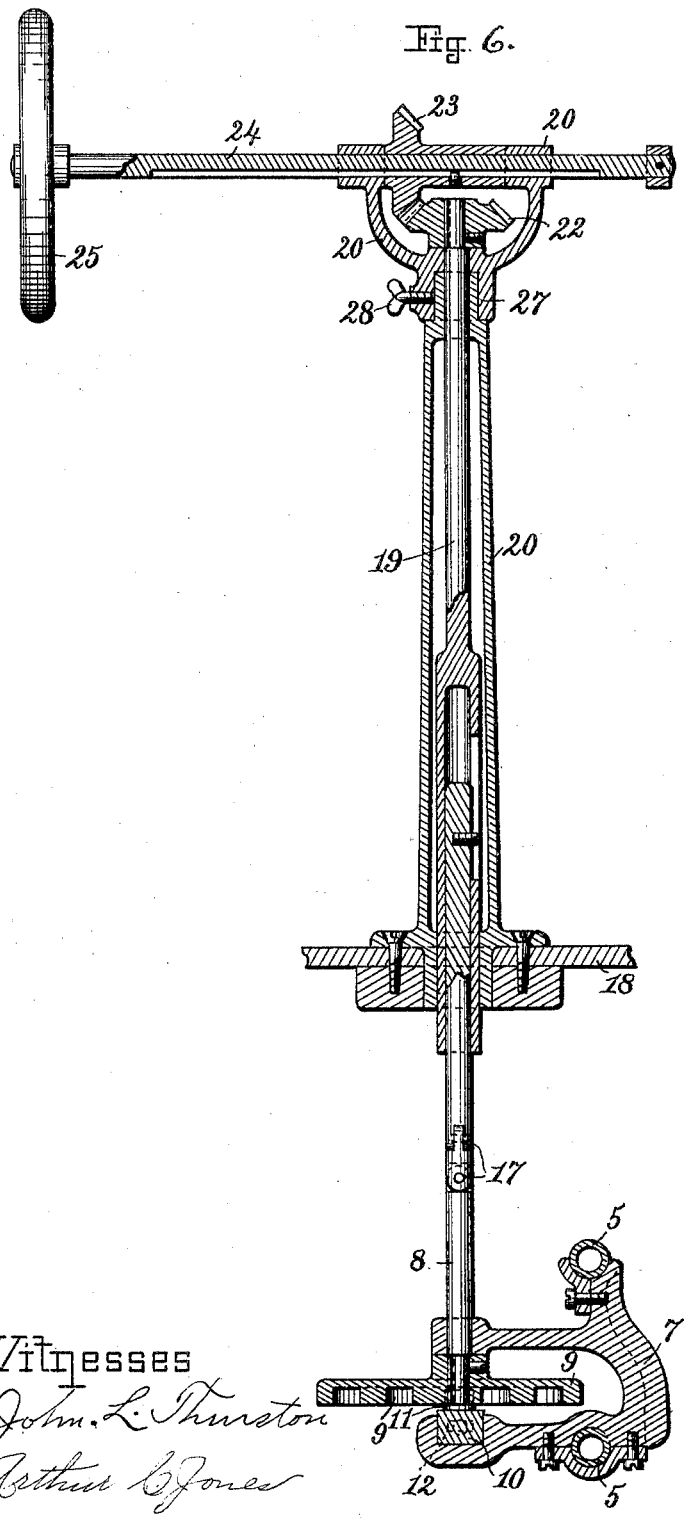

No. 784,042. PATENTED MAR. 7, 1905.
A. B. FOWLER.
STEERING GEAR.
APPLICATION FILED NOV. 3, 1900.
3 SHEETS—SHEET 1.
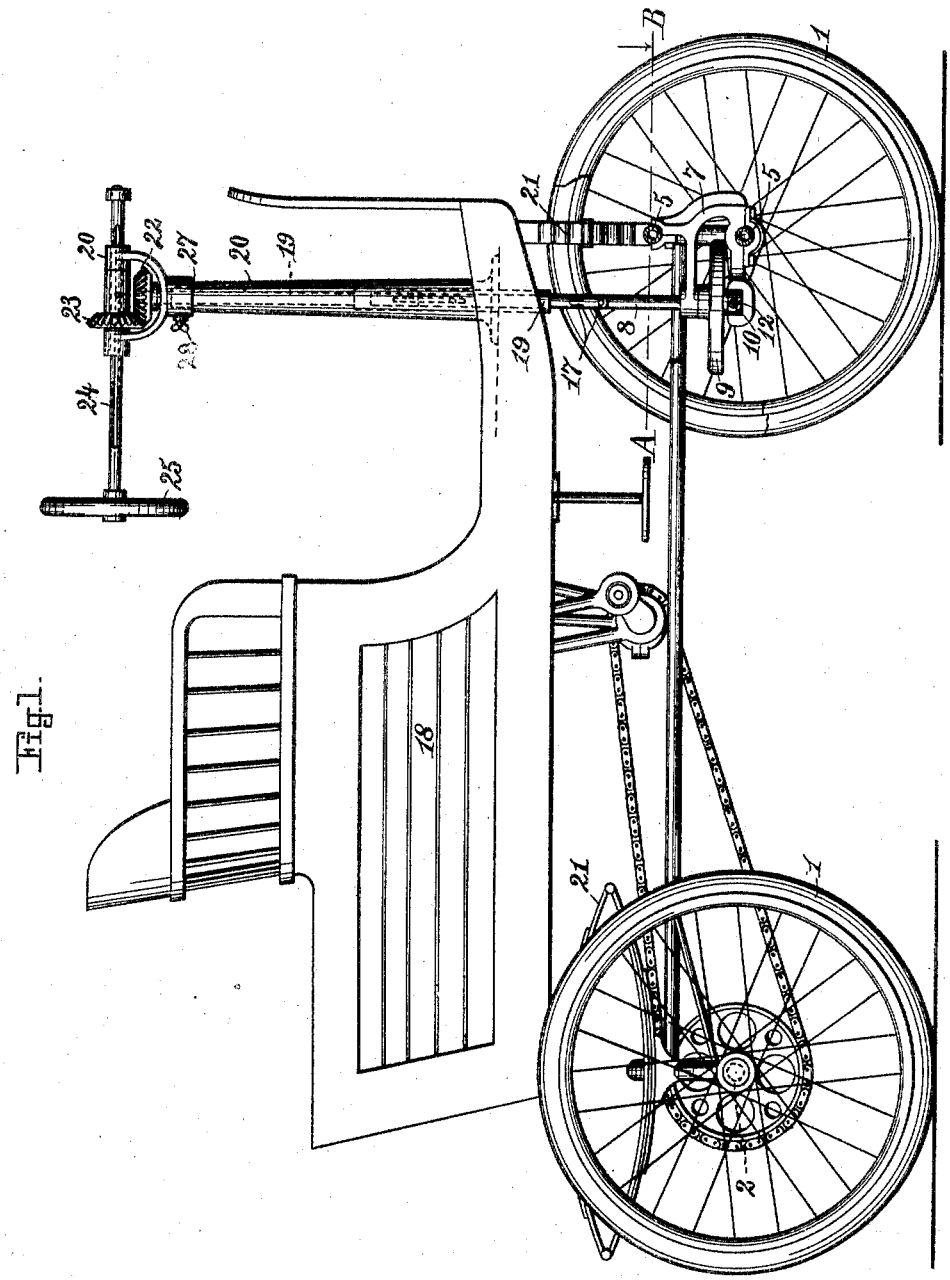
Witnesses
John L. Thurston
Arthur C. Jones
Inventor
Alfred B. Fowler
by
Henry Chadbourn
his atty.

No. 784,042. PATENTED MAR. 7, 1905.
A. B. FOWLER.
STEERING GEAR.
APPLICATION FILED NOV. 3, 1900.
3 SHEETS—SHEET 2.
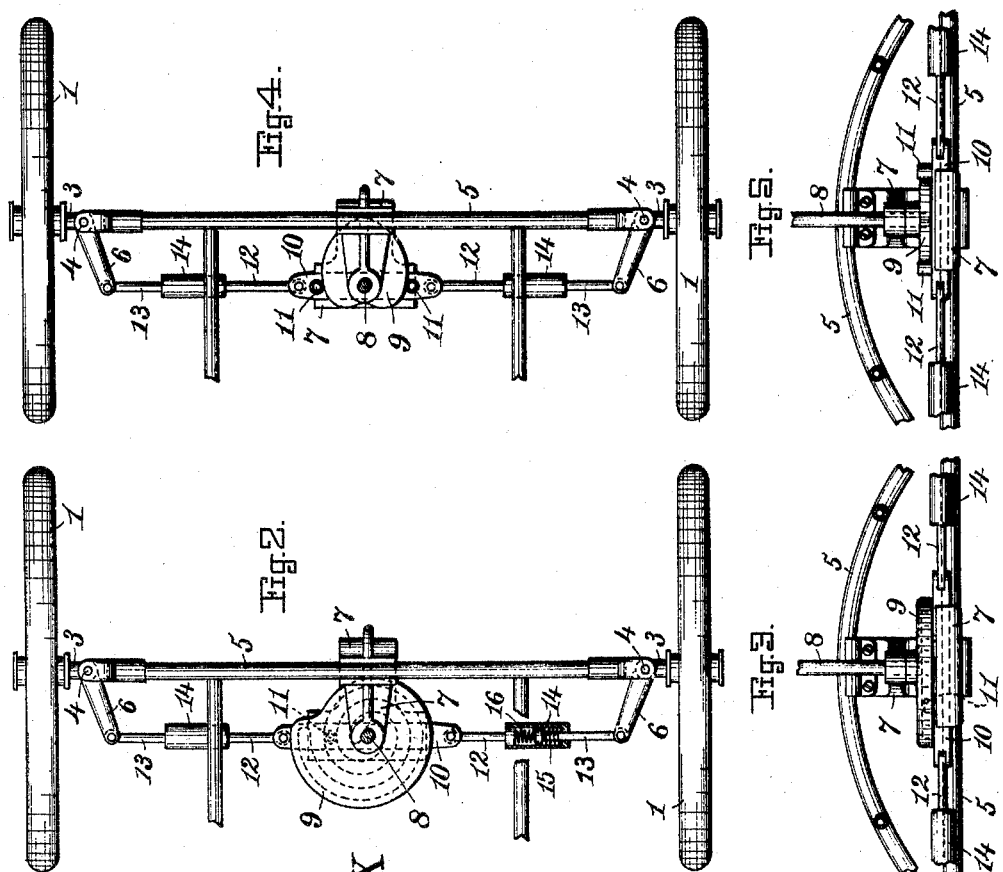

No. 784,042. PATENTED MAR. 7, 1905.
A. B. FOWLER.
STEERING GEAR.
APPLICATION FILED NOV. 3, 1900.

3 SHEETS—SHEET 3.

Witnesses
John L. Thurston
Arthur C. Jones

Inventor
Alfred B. Fowler
by Henry Chadbourn
his atty.

No. 784,042.                                         Patented March 7, 1905.

UNITED STATES PATENT OFFICE.

ALFRED B. FOWLER, OF CENTRAL FALLS, RHODE ISLAND.

STEERING-GEAR.

SPECIFICATION forming part of Letters Patent No. 784,042, dated March 7, 1905.

Application filed November 3, 1900. Serial No. 35,421.

*To all whom it may concern:*

Be it known that I, ALFRED B. FOWLER, of Central Falls, in the county of Providence and State of Rhode Island, have invented certain new and useful Improvements in Steering-Gears, of which the following is a specification.

This invention relates to an improved steering-gear for motor-vehicles.

In motor-vehicles as commonly constructed it is customary to secure the steering-wheels to the ends of the axle by independent pivotal connections which permit the wheels to be swung laterally in either direction to steer the vehicle without swinging the axle as a whole, as in a horse-drawn vehicle. The axes of the pivotal connections between the wheels and the axle are on lines passing through or near to the points of contact between the wheels and the ground, so that obstacles encountered directly by the wheels have little or no tendency to move the wheels laterally and deflect the vehicle from its course; but in the operation of the vehicles, particularly of those having great weight and speed, it has been found that ruts and other obstructions which encounter the wheel obliquely or laterally have a powerful tendency to deflect the wheels and to divert the vehicle from its course, besides transmitting disagreeable shocks to the hand of the operator of the vehicle, or even wrenching the hand-lever or other controlling member from the operator's grasp. In order to obviate the danger and inconvenience of such an arrangement, it has been customary to introduce in the connections between the steering-wheels and the hand-wheel or tiller an irreversible mechanism—*i. e.*, a mechanism capable of transmitting motion in one direction only—the irreversible mechanism being arranged to permit the operator to turn the wheels freely about their pivots by moving the controlling member, but absolutely to prevent the wheels, under the influence of a lateral stress, from moving the controlling member by a reverse operation of the connecting mechanism. By this arrangement the controlling member is made wholly irresponsive to the wheels and the transmission of shocks to the hand of the operator is avoided; but a new difficulty is introduced. Since the irreversible member is irresponsive to the tendency of the wheels to move laterally, the wheels are held rigidly at all times, and this results in severe strain upon the wheels, the irreversible mechanism, and the connections between these parts whenever a considerable lateral force is encountered by the wheels.

It is one object of the present invention to avoid the disadvantage above described resulting from the introduction of irreversible mechanism, and to this end the invention contemplates the introduction of springs in the connections between the irreversible mechanism and the wheels, by which the wheels may be permitted to yield laterally independently of the irreversible mechanism, being returned, however, to their proper direction by the springs when the lateral stress is removed. In the preferred form of the invention each steering-wheel is connected with the irreversible mechanism by independent spring connections, so that the wheels may yield independently of each other as well as of the irreversible mechanism. Thus if one wheel only encounter an obstacle, as is usually the case, that wheel alone will be deflected from its proper direction, and the tendency of such wheel to deflect the vehicle from its proper course will be resisted by the other steering-wheel, which will remain true.

Another object of the invention is to produce an improved form of connecting and supporting mechanism for the hand-wheel or other controlling member; and to this end the invention consists in the improved steering-gear hereinafter described, and more particularly defined in the claims.

In the drawings, Figure 1 is a side elevation of a motor-vehicle embodying the present invention. Fig. 2 is a plan view on the line A B, Fig. 1. Fig. 3 is a front elevation of the same parts. Fig. 4 and 5 are similar to Figs. 2 and 3, respectively, with the exception of certain modifications of the cam mechanism; and Fig. 6 is a vertical median section of the steering-gear.

The illustrated embodiment of the present invention is constructed as follows: The steering-wheels 1 of the vehicle are mounted in the usual manner on short axles 3, pivoted at vertical knuckle-joints 4 on the ends of the truss-axle 5. Arms 6, fixed to the axles 3, are connected, through members 12, 13, and 14, with a slide 10, having a bearing in the bracket 7, fixed to the truss 5. The slide 10 carries one or more roller-pins 11, engaging a horizontal cam 9. In Figs. 2 and 3 a grooved cam is shown engaged by a single pin, while Figs. 4 and 5 show a peripheral cam engaged by two pins. The cam 9 is fixed to a vertical shaft 8, provided with a universal joint 17. The shaft 8 is rotatably connected by a pin-and-slot connection with a shaft 19, journaled in the steering-column 20, which latter is fixed to the floor of the body 18 of the vehicle. The universal joint 17 and the pin-and-slot connection permit independent movement of the body and the running-gear when the supporting-springs 21 are compressed.

The vertical shaft 19 is turned through the medium of a bevel-gear 22, fixed thereon, and a bevel-gear 23, mounted upon and splined to a horizontal shaft 24, journaled in a yoke 20, mounted on the head of the steering-column. A hand-wheel 25, fixed on the horizontal shaft, serves as a controlling member to operate the entire train of mechanism above described. The yoke 20 is journaled on a stem 27 at the top of the steering-column and provided with a set-screw 28 to prevent rotation when desirable.

The members 12 and 13 are short connecting-rods pivotally attached to the slide 10 and the arms 6, respectively, and connected together by the spring devices 14, which comprise sleeves fixed to the connecting-rods 12 and loosely inclosing the ends of the connecting-rods 13. Upon the ends of the latter are heads engaged on either side by springs 15, the other ends of which engage the ends of the sleeves and of the connecting-rods 12, fixed therein. These springs 15 permit a limited endwise movement of the connecting-rods 13 with respect to the sleeves and the rods 12.

The arrangement of cam and pins above described constitutes an irreversible mechanism, since the pitch of the cam is such that the pins cannot rotate it.

Although double opposed springs have been shown in the yielding devices, being deemed preferable in this connection, single springs may be used; but the arrangement shown possesses the advantage of permitting the springs to be under initial compression, yet ready to yield to any disturbing force. however slight, in proportion to its strength. This arrangement has the further advantage of preventing the transmission of vibrations in either direction from either wheel through the connecting mechanism.

The construction of the steering-column and the parts mounted thereon permits the convenient disposal of the steering-wheel while the operator is leaving or entering the vehicle. The hand-wheel 25 and its shaft may be swung to either side about the journal 27, or it may be pushed forward, the shaft 24 sliding through the gear 23. These arrangements also permit of the wheel being manipulated in the most convenient position by either occupant of the carriage.

I am aware that it has been proposed to provide a traction-engine with a steering-gear in which the steering-wheels are carried by a centrally-pivoted axle which is turned upon its pivot by a worm-and-gear mechanism, springs being interposed between the axle and the mechanism to permit the wheels to yield to obstacles. This arrangement, however, is inapplicable to motor-vehicles as usually constructed and does not effectively accomplish the intended result. Since a considerable deflection of the axle must occur to turn the wheels substantially from a straight course, and owing also to the position of the pivots, the slight yielding of the axle permitted by the springs does not allow the wheels to yield substantially to a lateral stress, but serves merely to allow the wheels to move backward under the influence of an obstacle encountered directly. Moreover, both wheels must in this arrangement move at once in opposite directions, so that the effectiveness of the device is greatly reduced owing to the inertia of the wheels and axle, and the advantages of the independent wheel movement permitted by the applicant's preferred construction are not gained.

The present invention is not limited to the details of construction of the embodiment shown and described, but may be embodied in many other forms substantially defined in the claims.

The term "controlling member" as used in the claims designates the hand-wheel, tiller, or other device by which the operator of the vehicle controls the steering-gear.

I claim—

1. A steering-gear for motor-vehicles, having, in combination, a controlling member, an irreversible mechanism connected therewith, steering-wheels independently pivoted at points near their planes of rotation, and connections between the steering-wheels and the irreversible mechanism including spring members acting to permit lateral movement of the wheels independently of the irreversible mechanism, substantially as described.

2. A steering-gear for motor-vehicles, having, in combination, a controlling member, an irreversible mechanism connected therewith, pivoted steering-wheels arranged to have independent lateral movement, and connections between the wheels and the irreversible mechanism including springs acting to permit each steering-wheel to yield laterally independently of the irreversible mechanism and the other steering-wheel, substantially as described.

3. A steering-gear for motor-vehicles, having, in combination, steering-wheels, a controlling member, a rotatable shaft on which the controlling member is mounted for transmitting motion by its rotation from the controlling member to the steering-wheels, and supporting means for the said shaft permitting angular displacement thereof about a substantially vertical axis, substantially as described.

4. A steering-gear for motor-vehicles, having, in combination, steering-wheels, a controlling member, a horizontal shaft carrying the controlling member and rotatable thereby, means for supporting the horizontal shaft and permitting angular displacement thereof about a vertical axis, and means operated by the rotation of the horizontal shaft for transmitting motion from the controlling member to the steering-wheels, substantially as described.

5. A steering-gear for motor-vehicles, having, in combination, steering-wheels, a controlling member, a rotatable shaft on which the controlling member is mounted for transmitting, by its rotation, motion from the controlling member to the steering-wheels, and means for supporting the said shaft permitting both longitudinal and angular displacement thereof, substantially as described.

6. A steering-gear for motor-vehicles, having, in combination, steering-wheels, a controlling member, connections between the said wheels and the controlling member including a cam and a cam-follower, connecting-rods between the cam-follower and the steering-wheels, and spring connections between the said connecting-rods, acting to permit lateral movement of the steering-wheels independently of the irreversible mechanism, substantially as described.

In testimony whereof I have affixed my signature in presence of two witnesses.

ALFRED B. FOWLER.

Witnesses:
GEORGE B. VOSE,
HIRAM C. JENKS.